United States Patent [19]

Ohmori et al.

[11] Patent Number: 4,487,892

[45] Date of Patent: Dec. 11, 1984

[54] RUBBER COMPOSITIONS FOR USE IN TIRES

[75] Inventors: Toshio Ohmori, Yokkaichi; Mineo Yamamoto, Suzuka, both of Japan

[73] Assignees: Bridgestone Tire Co., Ltd.; Japan Synthetic Rubber Co., Ltd., both of Tokyo, Japan

[21] Appl. No.: 480,617

[22] Filed: Mar. 30, 1983

[30] Foreign Application Priority Data

Mar. 30, 1982 [JP]  Japan .................................. 57-49998

[51] Int. Cl.$^3$ .......................... C08L 7/00; C08L 9/00; C08L 9/06; C08L 13/02
[52] U.S. Cl. .................................. 525/237; 525/232; 525/236; 525/241; 525/233
[58] Field of Search ............... 525/232, 233, 241, 236, 525/237, 213, 214

[56] References Cited

U.S. PATENT DOCUMENTS

| | | | |
|---|---|---|---|
| 4,224,197 | 9/1980 | Ueda et al. .......................... | 525/232 |
| 4,309,318 | 1/1982 | Ahagon et al. ..................... | 525/232 |

FOREIGN PATENT DOCUMENTS

| | | |
|---|---|---|
| 1167677 | 4/1964 | Fed. Rep. of Germany . |
| 933593 | 1/1948 | France . |
| 1405661 | 5/1965 | France . |
| 2218348 | 9/1974 | France . |
| 744258 | 2/1956 | United Kingdom . |
| 763645 | 12/1956 | United Kingdom . |
| 886823 | 1/1962 | United Kingdom . |
| 907799 | 10/1962 | United Kingdom . |
| 1139267 | 1/1969 | United Kingdom . |
| 1437786 | 6/1976 | United Kingdom . |

OTHER PUBLICATIONS

Patent Abstracts of Japan, vol. 7, No. 83, (C-160), (1228), Apr. 7, 1983.

*Primary Examiner*—Allan M. Lieberman
*Attorney, Agent, or Firm*—Sughrue, Mion, Zinn, Macpeak & Seas

[57] ABSTRACT

A rubber composition for use in tires is disclosed, which comprises 1–30% by weight of a non-crystallizable resinous polymer having Tg of not less than 110° C. and 70–99% by weight of at least one rubber selected from styrene-butadiene copolymer rubber containing not more than 60% by weight of bound styrene, natural rubber, polybutadiene rubber having 1,4-configuration of not less than 80%, polybutadiene rubber having 1,2-configuration of not less than 50%, butyl rubber, halogenated butyl rubber and polyisoprene rubber having cis-1,4-configuration of not less than 90%.

3 Claims, No Drawings

RUBBER COMPOSITIONS FOR USE IN TIRES

This invention relates to rubber compositions for use in tires obtained by adding rubbery polymer with resinous polymer having a high glass transition temperature (hereinafter abbreviated as Tg), and more particularly to a rubber composition suitable for use in tires having high driving performances, i.e. considerably improved controllability and stability during high-speed running.

Up to now, safety, economical efficiency, ride feeling and the like are required in performance of automobile tires. Lately, demand for safety and economical efficiency has become greater and hence tire materials are also required to satisfy these requirements. As specific requirements for rubber as a tire material, there are high tensile strength, high tensile stress, low-temperature dependence of tensile stress, low-temperature dependence of hardness, adhesion property, wear resistance, low heat build-up, high skid resistance and the like.

With the increase of expressway networks, it has been strongly desired to develop tires with considerably improved controllability mainly based on a response to slight steering required in the changing of lanes, the avoiding of dangers on straight or curved roads or the like during high-speed running of vehicles, and the stability such as cornering properties or the like.

In order to enhance the driving performances of the tire, it is necessary to increase not only hardness (modulus of elasticity) and breaking strength, particularly hardness and breaking strength at elevated temperatures of rubber compositions, particularly tread rubber composition but also hysteresis loss thereof. Particularly, the increase of the hardness is significant in the improvement of controllability, while the increase of the hysteresis loss is significant in the improvement of the stability, particularly improvement of gripping property such as cornering properties and the like.

In this connection, it is very difficult to compound a rubber composition so as to simultaneously satisfy the increases of hardness and breaking strength and the reduction of hysteresis loss by the conventional compounding technique. For instance, the single use of styrene-butadiene copolymer rubber (SBR) having a higher content of bound styrene is insufficient in the modulus of elasticity, particularly modulus of elasticity at an elevated temperature. Therefore, styrene resin or styrene-butadiene block copolymer rubber is added to such an SBR, but in this case the hardness and dynamic storage modulus are reduced due to the heat build-up in the high-speed running of the tire and the controllability of the tire becomes bad and the wear resistance is largely deteriorated, so that these addition means are not accepted for the manufacture of tires having high driving performances. Furthermore, there are usually adopted a method of increasing an amount of carbon black added and a method of increasing an amount of sulfur added. However, the former method causes the reduction of breaking strength and the remarkable reduction of workability (occurrence of scorching at extrusion or rolling), while the latter method reduces the hysteresis loss. Further, both the methods degrade the wear resistance. Therefore, such methods are not acceptable for achieving the object of the invention.

The inventors have made various studies with respect to rubber materials for use in tires having not only high tensile strength, tensile stress and hardness at room temperature as well as high hardness, tensile strength and modulus of elasticity at an elevated temperature but also a large hysteresis loss and found out that a particular rubber composition containing a resinous polymer with a high Tg as a main ingredient is well suitable for achieving the object of the invention, and as a result the invention has been accomplished.

The rubber composition according to the invention comprises 1 to 30% by weight of (I) a non-crystallizable resinous polymer having Tg of not less than 110° C. and 70 to 99% by weight of (II) at least one rubber selected from styrene-butadiene copolymer rubber containing not more than 60% by weight of bound styrene, natural rubber, polybutadiene rubber having 1,4-configuration of not less than 80%, polybutadiene rubber having 1,2-configuration of not less than 50%, halogenated butyl rubber, butyl rubber and polyisoprene rubber having cis-1,4-configuration of not less than 90%.

In the non-crystallizable resinous polymer to be used in the invention, Tg should be not less than 110° C., while the upper limit of Tg is not particularly restricted, but it is about 250° C. in view of available easiness. Because, when using the resinous polymer having Tg of less than 110° C., high modulus of elasticity and hardness at room temperature are satisfied, but the modulus of elasticity, hardness and tensile strength at an elevated temperature are not particularly improved as compared with those of rubber composition containing no resinous polymer. This resinous polymer may be produced by any polymerization methods, among which a radical polymerization using an organic peroxide as an initiator is usually used. Particularly, an emulsion polymerization is preferable when blending with emulsion-polymerized styrene-butadiene copolymer rubber latex.

The resinous polymer according to the invention includes homopolymers made from aromatic vinyl monomers such as α-methylstyrene, nuclear-substituted styrene, nuclear-substituted α-methylstyrene (for example, methyl group is preferable as a nuclear substitution group) or the like, acrylonitrile, vinylpyrrolidone, vinylcarbazole and the like, and copolymers obtained by polymerization of two or more monomers constituting the above homopolymers or by polymerization of at least two of the above mentioned monomers and other monomers. Among them, aromatic vinyl-series resinous polymers are preferable in the invention, a typical example of which includes α-methylstyrene homopolymer, α-methylstyrene-styrene copolymer, nuclear-substituted styrene homopolymer, nuclear-substituted α-methylstyrene homopolymer, styrene-nuclear-substituted styrene copolymer, styrene-nuclear-substituted α-methylstyrene copolymer, and copolymers thereof containing diene monomer. As the diene monomer, mention may be made of butadiene, isoprene, cyclopentadiene, dicyclopentadiene, ethylidene norbornene, 1,4-hexadiene and the like. The diene monomer-containing polymers include, for example, α-methylstyrene-styrene-butadiene terpolymer, α-methylstyrene-styrene-isoprene terpolymer, α-methylstyrene-isoprene copolymer and the like. In the latter case, at least one diene monomer is added to the polymer so as not to give Tg of less than 110° C.

Among the aromatic vinyl-series resinous polymers, α-methylstyrene homopolymer, α-methylstyrene-styrene copolymer, α-methylstyrene-butadiene copolymer, α-methylstyrene-isoprene copolymer, α-methylstyrene-styrene-butadiene terpolymer and α-methylstyrene-styrene-isoprene terpolymer, each of which having Tg of not less than 110° C., are preferable in view of the balance among difficulty on availability of monomer, reactivity and Tg of the resulting polymer.

The rubber (II) to be used in the invention is at least one rubber selected from styrene-butadiene copolymer rubber containing not more than 60% by weight of bound styrene and produced by emulsion polymerization or solution polymerization using an organic alkali metal catalyst, natural rubber, polybutadiene rubber having 1,4-configuration of not less than 80% and produced by solution polymerization of butadiene using a transition metal catalyst or an organic alkali metal catalyst, polybutadiene rubber having 1,2-configuration of not less than 50% and produced by solution polymerization of butadiene using an organic alkali metal catalyst, polyisoprene rubber having cis-1,4-configuration of not less than 90% and produced by solution polymerization of isoprene using a transition metal catalyst or an organic alkali metal catalyst, halogenated butyl rubber and butyl rubber.

The amount of the rubber (II) used is 70 to 99% by weight. When the amount is less than 70% by weight, the tensile strength, tensile stress and hardness at an elevated temperature are not improved, while when the amount exceeds 99% by weight, not only the modulus of elasticity and hardness at room temperature but also the tensile strength, modulus of elasticity and hardness at an elevated temperature are not improved.

According to a preferred embodiment of the invention, the rubber composition for use in tires comprises 1 to 30% by weight of the non-crystallizable resinous polymer (I) and 15 to 99% by weight of styrene-butadiene copolymer rubber (II) containing more than 30% by weight but not more than 50% by weight of bound styrene, and further contains 0 to 84% by weight of at least one rubber selected from styrene-butadiene copolymer rubber containing not more than 30% by weight of bound styrene, natural rubber, polybutadiene rubber having 1,4-configuration of not less than 80%, polybutadiene rubber having 1,2-configuration of not less than 50%, polyisoprene rubber having cis-1,4-configuration of not less than 90%, halogenated butyl rubber and butyl rubber, which is particularly excellent in the high hardness, high modulus of elasticity and large hysteresis loss and can considerably improve the cornering stability and high-speed stability of the tire.

According to another preferred embodiment of the invention, the rubber composition for use in tires comprises 1 to 30% by weight of the non-crystallizable resinous polymer (I) and 30 to 99% by weight of styrene-butadiene copolymer rubber (II) containing 15 to 30% by weight of bound styrene, and further contains 0 to 69% by weight of at least one rubber selected from natural rubber, polybutadiene rubber having 1,4-configuration of not less than 80%, polybutadiene rubber having 1,2-configuration of not less than 50%, halogenated butyl rubber, butyl rubber and polyisoprene rubber having cis-1,4-configuration of not less than 90%, which improves not only the cornering stability and high-speed stability of the tire but also the wear resistance, so that it is advantageous for applications seriously taking the wear resistance.

To the rubber composition for use in tires according to the invention may properly be added additives usually used in rubber industry such as carbon black, process oil, sulfur, vulcanization accelerator, accelerator activator, antioxidant and the like.

The working and vulcanizing methods of the thus obtained rubber composition are not particularly restricted. For instance, ingredients for the rubber composition may be thoroughly mixed in a mixing machine such as rolls, Banbury mixer or the like and then vulcanized in the usual manner using a vulcanizing pan, a vulcanizing press or the like.

The rubber compositions for use in tires according to the invention are preferably used as a tread rubber and a sidewall rubber in radial tires, particularly radial tire for passenger car and radial tire for heavy vehicles such as truck and bus as well as tires for motorcycles, but are not intended as limitations thereof. For instance, they may be applied not only to other tire parts such as bead portion and the like but also to tires for construction vehicles, agricultural tires and bias tires for heavy vehicles such as truck and bus. Moreover, it is a matter of course that the rubber compositions as shown in Examples 3 to 5 and 8 are embodiments of the invention.

The following examples are given in illustration of the invention and are not intended as limitations thereof.

In these examples, a rubber composition was prepared according to a compounding recipe as shown in the following Table 1.

TABLE 1

|  | part by weight |
|---|---|
| Resinous polymer | 10 |
| Styrene-butadiene copolymer rubber*1 | 90 |
| Zinc white | 3 |
| Stearic acid | 1.5 |
| Sulfur | 2 |
| Carbon black HAF | 50 |
| Vulcanization accelerator (Nocceler-NS)*2 | 0.9 |

*1 emulsion-polymerized styrene-butadiene copolymer rubber containing 23.5% by weight of bound styrene
*2 N—t-butyl-2-benzolthiazole sulfeneamide, made by Ohuchi Shinko Kagaku K. K.

EXAMPLES 1 TO 2, COMPARATIVE EXAMPLES 1 TO 2

In 200 parts by weight of water was dissolved 5 parts by weight of potassium oleate, to which was added 100 parts by weight of α-methylstyrene. To the resulting emulsion were added an activator containing 0.1 part by weight of tetrasodium ethylenediaminetetraacetate, 0.02 part by weight of ferrous sulfate heptahydrate and 0.1 part by weight of sodium dimethylsulfoxylate and further 0.1 part by weight of cumene hydroperoxide to conduct emulsion polymerization at 15° C. After 30 hours, α-methylstyrene homopolymer (hereinafter abbreviated as PαMS) was obtained in a yield of 27%. After the unreacted monomer was removed by steam distillation, the resulting homopolymer was solidified with an acid, subjected to a centrifugal dehydration and then dried in draft. The thus obtained α-methylstyrene homopolymer had Tg of 180° C. as measured by a differential scanning calorimeter (DSC).

The polymerization of acrylonitrile was performed by the same method as described above, after 10 hours of which the conversion was 90%. The resulting acrylonitrile homopolymer (hereinafter abbreviated as PAN) after the drying had Tg of 125° C.

Then, a rubber composition was prepared by using the α-methylstyrene homopolymer and acrylonitrile homopolymer according to the compounding recipe shown in Table 1 and vulcanized at 145° C. for 35 minutes. The properties of the resulting vulcanizate were measured to obtain results as shown in the following Table 2. For the comparison, the properties of vulcanizate containing no resinous polymer (Comparative Example 1) and vulcanizate containing emulsion-polymerized polystyrene (hereinafter abbreviated as PS) with Tg of 100° C. (Comparative Example 2) are also shown in Table 2.

mer having Tg of 114° C. was obtained in a conversion of 90% after the copolymerization at 15° C. for 10 hours by using 35 parts by weight of α-methylstyrene and 65 parts by weight of styrene (Example 3). Further, α-methylstyrene-styrene copolymer having Tg of 129° C.

TABLE 2

|  | Comparative Example 1 | Example 1 | Example 2 | Comparative Example 2 |
|---|---|---|---|---|
| Properties of vulcanizate |  |  |  |  |
| Kind of resinous polymer | — | PαMS | PAN | PS |
| Tg (°C.) | — | 180 | 125 | 100 |
| Addition amount of resinous polymer (part by weight) | — | 10 | 10 | 10 |
| Mooney viscosity of rubber composition, $ML_{1+4}$ (100° C.) | 50 | 65 | 59 | 57 |
| 200% tensile stress, kg/cm² |  |  |  |  |
| 25° C. | 104 | 170 | 165 | 170 |
| 70° C. | 96 | 155 | 142 | 130 |
| 100° C. | 95 | 148 | 131 | 114 |
| 120° C. | 94 | 144 | 125 | 103 |
| 300% tensile stress, kg/cm² |  |  |  |  |
| 25° C. | 205 | 275 | 265 | 270 |
| 70° C. | 185 | 237 | 222 | 217 |
| 100° C. | 176 | 218 | 202 | 190 |
| 120° C. | 171 | 207 | 187 | 174 |
| Tensile strength, kg/cm² |  |  |  |  |
| 25° C. | 295 | 285 | 290 | 290 |
| 70° C. | 196 | 218 | 208 | 205 |
| 100° C. | 154 | 183 | 175 | 160 |
| 120° C. | 130 | 160 | 149 | 135 |
| Hardness (JIS K-6301 spring hardness test) |  |  |  |  |
| 25° C. | 66 | 77 | 74 | 76 |
| 70° C. | 64 | 74 | 71 | 72 |
| 100° C. | 63 | 72 | 69 | 69 |
| 120° C. | 63 | 71 | 69 | 66 |

As apparent from the data of Table 2, the rubber compositions of Examples 1 and 2 each containing the non-crystallizable resinous polymer with high Tg considerably improve the modulus of elasticity (i.e. tensile stress) and hardness at room temperature and further improve the hardness, tensile strength and modulus of ealsticity at elevated temperatures as compared with the rubber composition of Comparative Example 1 containing no resinous polymer.

Furthermore, it is apparent from the comparison of Comparative Example 2 with Examples 1 and 2 that when using the resinous polymer with Tg of 100° C., the hardness, tensile strength and modulus of elasticity (tensile stress) at elevated temperatures are hardly improved.

EXAMPLES 3 TO 5

In this example, α-methylstyrene and styrene were copolymerized by the same emulsion polymerization method as described in Example 1 to obtain α-methylstyrene-styrene copolymer [hereinafter abbreviated as P(αMS/S)]. That is, α-methylstyrene-styrene copolymer was obtained in a conversion of 60% after the copolymerization at 15° C. for 20 hours by using 55 parts by weight of α-methylstyrene and 45 parts by weight of styrene (Example 4). And also, α-methylstyrene-styrene copolymer having Tg of 149° C. was obtained in a conversion of 40% after the copolymerization at 15° C. for 30 hours by using 85 parts by weight of α-methylstyrene and 15 parts by weight of styrene (Example 5).

Then, a latex of the α-methylstyrene-styrene copolymer was mixed with a latex of an emulsion-polymerized styrene-butadiene copolymer rubber containing 23.5% by weight of bound styrene in the mixing ratio of resinous polymer to styrene-butadiene copolymer rubber as shown in Table 1, solidified with acid-salt, dehydrated and dried in draft to form a rubber blend. This rubber blend was compounded with other ingredients according to the compounding recipe shown in Table 1 and then vulcanized in the same manner as described in Example 1. Thereafter, the properties of the resulting vulcanizate were measured to obtain results as shown in the following Table 3.

TABLE 3

|  | Comparative Example 2 | Example 3 | Example 4 | Example 5 | Example 1 |
|---|---|---|---|---|---|
| Properties of vulcanizate |  |  |  |  |  |
| Kind of resinous polymer | PS | P(αMS/S) | P(αMS/S) | PαMS |  |
| Tg (°C.) | 100 | 114 | 129 | 148 | 180 |
| Addition amount of resinous polymer (part by weight) | 10 | 10 | 10 | 10 | 10 |
| Mooney viscosity of rubber composition, $ML_{1+4}$(100° C.) | 57 | 58 | 60 | 62 | 65 |
| 200% tensile stress, kg/cm² |  |  |  |  |  |
| 25° C. | 170 | 172 | 169 | 169 | 170 |
| 70° C. | 130 | 138 | 145 | 150 | 155 |

TABLE 3-continued

|  | Comparative Example 2 | Example 3 | Example 4 | Example 5 | Example 1 |
|---|---|---|---|---|---|
| 100° C. | 114 | 126 | 133 | 141 | 148 |
| 120° C. | 103 | 113 | 126 | 138 | 144 |
| 300% tensile stress, kg/cm$^2$ | | | | | |
| 25° C. | 270 | 275 | 274 | 273 | 275 |
| 70° C. | 217 | 220 | 220 | 232 | 237 |
| 100° C. | 190 | 200 | 205 | 211 | 218 |
| 120° C. | 174 | 180 | 189 | 203 | 207 |
| Tensile strength, kg/cm$^2$ | | | | | |
| 25° C. | 290 | 285 | 290 | 287 | 285 |
| 70° C. | 205 | 208 | 210 | 215 | 218 |
| 100° C. | 160 | 165 | 168 | 174 | 183 |
| 120° C. | 135 | 140 | 143 | 150 | 160 |
| Hardness (JIS K-6301 spring hardness test) | | | | | |
| 25° C. | 76 | 76 | 77 | 77 | 77 |
| 70° C. | 72 | 73 | 73 | 74 | 74 |
| 100° C. | 69 | 70 | 71 | 72 | 72 |
| 120° C. | 66 | 68 | 69 | 70 | 71 |

As apparent from the comparison of Examples 1 and 3 to 5 with Comparative Example 2 in Table 3, when Tg of the α-methylstyrene-styrene copolymer is not less than 110° C., the tensile strength, modulus of elasticity (tensile stress) and hardness at elevated temperatures are improved. From this fact, it is understood that Tg of the resinous polymer should be not less than 110° C.

As apparent from the above, the rubber compositions having a high glass transition temperature according to the invention give highly improved tensile strength and hardness at room temperature as well as improved tensile strength, modulus of elasticity (tensile stress) and hardness at elevated temperatures.

EXAMPLES 6 TO 7, COMPARATIVE EXAMPLES 3 TO 4

Various vulcanizates were produced under the same conditions as described in Example 1 only by changing the mixing ratio of resinous polymer to styrene-butadiene copolymer rubber in the compounding recipe of Table 1 and their properties were measured to obtain results as shown in the following Table 4.

TABLE 4

|  | Comparative Example 3 | Example 6 | Example 1 | Example 7 | Comparative Example 4 |
|---|---|---|---|---|---|
| Properties of vulcanizate | | | | | |
| Kind of resinous polymer | PαMS | PαMS | PαMS | PαMS | PαMS |
| Tg (°C.) | 180 | 180 | 180 | 180 | 180 |
| Addition amount of resinous polymer (part by weight) | 0.5 | 2 | 10 | 25 | 35 |
| Mooney viscosity of rubber composition, ML$_{1+4}$(100° C.) | 50 | 53 | 65 | 83 | 96 |
| 200% tensile stress, kg/cm$^2$ | | | | | |
| 25° C. | 108 | 135 | 170 | 208 | 226 |
| 70° C. | 100 | 126 | 155 | 172 | 176 |
| 100° C. | 99 | 123 | 148 | 161 | 147 |
| 120° C. | 97 | 122 | 144 | 145 | 126 |
| 300% tensile stress, kg/cm$^2$ | | | | | |
| 25° C. | 208 | 235 | 275 | 342 | 378 |
| 70° C. | 189 | 212 | 237 | 265 | 279 |
| 100° C. | 180 | 201 | 218 | 241 | 234 |
| 120° C. | 173 | 196 | 207 | 227 | 204 |
| Tensile strength, kg/cm$^2$ | | | | | |
| 25° C. | 296 | 290 | 285 | 257 | 210 |
| 70° C. | 195 | 205 | 218 | 200 | 172 |
| 100° C. | 153 | 165 | 183 | 176 | 152 |
| 120° C. | 130 | 142 | 160 | 158 | 138 |
| Hardness (JIS K-6301 spring hardness test) | | | | | |
| 25° C. | 66 | 69 | 77 | 85 | 90 |
| 70° C. | 64 | 68 | 74 | 75 | 74 |
| 100° C. | 64 | 66 | 72 | 71 | 66 |
| 120° C. | 63 | 65 | 71 | 69 | 63 |

As apparent from the comparison of Examples 1, 6 and 7 with Comparative Example 3, when the mixing ratio of the resinous polymer is less than 1.0% by weight, the merit of the invention can not be obtained. On the other hand, it is understood from Comparative Example 4 that when the mixing ratio of the resinous polymer exceeds 30% by weight, the tensile strength lowers. From these facts, it is obvious that the mixing ratio of the resinous polymer is preferable within a range of 1 to 30% by weight.

EXAMPLE 8

Two rubber blends (A) and (B) were prepared in the same manner as described in Example 3 by using an α-methylstyrene-styrene copolymer having Tg of 129° C., which was obtained by copolymerizing 55 parts by weight of α-methylstyrene and 45 parts by weight of styrene at 15° C. for 20 hours in the same manner as described in Example 3.

In the rubber blend (A), the mixing ratio (by weight) of α-methylstyrene-styrene copolymer to emulsion-polymerized styrene-butadiene copolymer rubber (SBR) containing 23.5% by weight of bound styrene was 15:85. In the rubber blend (B), the mixing ratio (by weight) of α-methylstyrene-styrene copolymer to emulsion-polymerized styrene-butadiene copolymer rubber (SBR) containing 35.0% by weight of bound styrene was 15:85.

Seventeen tread rubber compositions for use in radial tires for passenger cars were prepared by using the rubber blends (A) and (B) according to a compounding recipe as shown in the following Table 5. In Comparative Examples of Table 5, there was used a rubber composition containing high styrene content styrene-butadiene copolymer rubber, styrene-butadiene block copolymer rubber (content of bound styrene: 48% by weight), styrene resin, or increased amount of carbon black or sulfur. Then, seventeen radial tires for passenger car having a tire size of 185/70 HR 14 were manufactured by using the above seventeen tread rubber composition as a tire tread.

The hardness, maximum tensile elongation, tensile strength, dynamic storage modulus (E') and loss tangent (tan δ) of the tread rubber composition and the controllability, stability (particularly cornering stability), wear resistance and resistance to crack chipping of the tire were evaluated to obtain results as shown in Table 5.

The properties of the tire were evalucated as follows.

CONTROLLABILITY

The test tire was run on concrete road, on which pylons were set at an interval of 50 m, at a speed of 120 km/hr under standard internal pressure and load over a predetermined distance, during which the controllability was evaluated by a driver's feeling and defined by an index on the basis that the tire of the tread rubber composition No. 10 is 100. The larger the index value, the better the property.

STABILITY

The test tire was mounted on a vehicle and actually run on a circuit course under standard internal pressure and load three laps to measure an average lap time, from which an index of the stability was calculated according to the following equation:

$$\frac{\text{Average lap time of the tire of the tread rubber composition No. 10}}{\text{Average lap time of test tire}} \times 100$$

The larger the index value, the better the property.

WEAR RESISTANCE

Apart from the tires used for the evaluations of controllability and stability, a tire having a two-part tread was manufactured by using the tread rubber composition No. 10 as the one part and using each of the other tread rubber compositions to be tested as the other part and then run on paved road over a distance of 50,000 km. Thereafter, the depths of the remaining tread grooves were measured, from which an index of wear resistance was calculated according to the following equation:

$$\frac{\text{Remaining groove depth of tread rubber composition to be tested}}{\text{Remaining groove depth of tread rubber composition No. 10}} \times 100$$

The larger the index value, the better the property.

RESISTANCE TO CRACK CHIPPING

The test tire having the same two-part tread as used in the evalucation of wear resistance was run on a bad road consisting of 70% of unpaved road and 30% of paved road over a distance of 50,000 km. Thereafter, the appearance of the tread was visually observed on the basis of the tread rubber composition No. 10 and evaluated at three stages o, Δ and × wherein o is good, × is bad and Δ is slightly bad.

TABLE 5

| | Tread rubber composition No. | | | | | | | | | | | | | | | | |
|---|---|---|---|---|---|---|---|---|---|---|---|---|---|---|---|---|---|
| | Example | | | | | | | | | Comparative example | | | | | | | |
| | 1 | 2 | 3 | 4 | 5 | 6 | 7 | 8 | 9 | 10 | 11 | 12 | 13 | 14 | 15 | 16 | 17 |
| Compounding recipe (parts by weight) | | | | | | | | | | | | | | | | | |
| Rubber blend (A) | 100 | 70 | — | — | — | — | — | — | — | — | — | — | — | — | — | 5 | — |
| Rubber blend (B) | — | — | 60 | 40 | 40 | 40 | 40 | 60 | 100 | — | — | — | — | — | — | — | 5 |
| Emulsion-polymerized SBR (content of bound styrene 23.5% by weight) | — | 20 | — | — | 20 | — | — | 40 | — | 100 | 100 | 100 | — | — | 100 | 65 | 65 |
| Emulsion-polymerized SBR (content of bound styrene 40% by weight) | — | — | — | — | — | 20 | — | — | — | — | — | — | 100 | — | — | — | — |
| Styrene-butadiene block copolymer rubber (content of bound styrene 48% by weight) | — | — | — | — | — | — | — | — | — | — | — | — | — | 100 | — | — | — |
| Natural rubber | — | — | 40 | 40 | 40 | 40 | 40 | — | — | — | — | — | — | — | — | — | — |
| Polybutadiene rubber *1 | — | 10 | — | 20 | — | — | — | — | — | — | — | — | — | — | — | 30 | 30 |
| Halogenated butyl rubber | — | — | — | — | — | — | 20 | — | — | — | — | — | — | — | — | — | — |
| Carbon black N-220 | 85 | 87 | 70 | 85 | 75 | 70 | 70 | 75 | 60 | 80 | 110 | 85 | 78 | 70 | 70 | 80 | 80 |
| aromatic oil | 35 | 35 | 25 | 35 | 25 | 25 | 25 | 25 | 15 | 45 | 55 | 35 | 32 | 30 | 30 | 45 | 45 |
| High-styrene resin (JSR 0061) | — | — | — | — | — | — | — | — | — | — | — | — | — | — | 20 | — | — |
| Stearic acid | 1 | 1 | 1 | 1 | 1 | 1 | 1 | 1 | 1 | 1 | 1 | 1 | 1 | 1 | 1 | 1 | 1 |
| Antioxidant IPPD *2 | 1 | 1 | 1 | 1 | 1 | 1 | 1 | 1 | 1 | 1 | 1 | 1 | 1 | 1 | 1 | 1 | 1 |

TABLE 5-continued

| | Tread rubber composition No. | | | | | | | | | | | | | | | | |
|---|---|---|---|---|---|---|---|---|---|---|---|---|---|---|---|---|---|
| | Example | | | | | | | | | Comparative example | | | | | | | |
| | 1 | 2 | 3 | 4 | 5 | 6 | 7 | 8 | 9 | 10 | 11 | 12 | 13 | 14 | 15 | 16 | 17 |
| Zinc white | 3 | 3 | 3 | 3 | 3 | 3 | 3 | 3 | 3 | 3 | 3 | 3 | 3 | 3 | 3 | 3 | 3 |
| Vulcanization accelerator DPG *3 | 0.6 | 0.5 | 0.2 | 0.4 | 0.2 | 0.3 | 0.6 | 0.4 | 0.55 0.5 | 0.6 | 0.6 | 0.4 | 0.4 | 0.3 | 0.6 | 0.6 | |
| Vulcanization accelerator MBTS *4 | 0.6 | 0.5 | 0.2 | 0.5 | 0.2 | 0.6 | 1.3 | 0.6 | 0.6 | 1.0 | 0.6 | 0.6 | 0.5 | 0.5 | 0.5 | 1.2 | 1.2 |
| Vulcanization accelerator OBS *5 | 0.2 | 0.3 | 1.3 | 0.7 | 1.2 | 0.8 | — | 0.6 | 0.25 | — | 0.2 | 0.5 | 0.3 | 0.3 | 0.7 | — | — |
| Sulfur | 1.5 | 1.5 | 1.5 | 1.5 | 1.5 | 1.5 | 1.5 | 1.5 | 1.5 | 2.0 | 1.5 | 4.0 | 2.0 | 1.5 | 1.5 | 2.0 | 2.0 |
| Mooney viscosity (ML$_{1+4}$, 130° C.) | 56 | 57 | 54 | 59 | 56 | 58 | 57 | 59 | 58 | 45 | 79 | 53 | 52 | 42 | 59 | 42 | 43 |
| Hardness (room temperature JIS K-6301 spring hardness test) | 69 | 69 | 73 | 70 | 72 | 72 | 70 | 70 | 71 | 58 | 67 | 64 | 62 | 75 | 69 | 59 | 69 |
| Maximum tensile elongation (room temperature) (%) | 470 | 460 | 480 | 470 | 478 | 469 | 467 | 410 | 475 | 490 | 350 | 370 | 470 | 540 | 370 | 485 | 487 |
| Tensile strength (room temperature) (kg/cm$^2$) | 210 | 205 | 204 | 195 | 197 | 194 | 185 | 178 | 200 | 180 | 152 | 154 | 176 | 190 | 140 | 176 | 174 |
| Hardness (100° C.) | 57 | 57 | 64 | 60 | 62 | 61 | 60 | 63 | 61 | 50 | 57 | 55 | 52 | 52 | 53 | 51 | 51 |
| Maximum tensile elongation (100° C.) | 410 | 403 | 450 | 440 | 450 | 448 | 430 | 380 | 420 | 340 | 240 | 230 | 350 | 480 | 235 | 332 | 328 |
| Dynamic storage modulus E' (kg/cm$^2$) *6 | 124 | 121 | 170 | 150 | 165 | 164 | 148 | 167 | 166 | 60 | 118 | 90 | 64 | 65 | 71 | 63 | 64 |
| Loss tangent tan δ *6 | 0.35 | 0.34 | 0.42 | 0.39 | 0.41 | 0.44 | 0.42 | 0.43 | 0.41 | 0.24 | 0.45 | 0.13 | 0.30 | 0.45 | 0.41 | 0.23 | 0.24 |
| Controllability | 125 | 123 | 160 | 140 | 152 | 150 | 140 | 158 | 154 | 100 | 117 | 84 | 101 | 102 | 104 | 100 | 100 |
| Stability (cornering properties) | 123 | 121 | 154 | 145 | 148 | 156 | 157 | 152 | 149 | 100 | 115 | 76 | 118 | 112 | 102 | 97 | 98 |
| Wear resistance | 125 | 127 | 105 | 110 | 108 | 105 | 103 | 104 | 107 | 100 | 43 | 35 | 60 | 40 | 54 | 105 | 104 |
| Resistance of crack chipping | o | o | o | o | o | o | o | o | o | o | x | x | Δ | x | x | o | o |

*1 : BR-01 made by JAPAN SYNTHETIC RUBBER CO., LTD.
*2 : N—phenyl-N'—isopropyl-p-phenylenediamine
*3 : Diphenyl guanidiene
*4 : Dibenzathiazyldisulfide
*5 : N—oxydiphenylene-2-benzothiazolesulfeneamide
*6 : Measured at 60° C. and 50 Hz under static strain of 5% or dynamic strain of 1% according to tensile method As apparent from the data Table 5, the controllability and stability of the tire can be greatly improved without lowering the wear resistance and resistance to crack chipping by applying the tread rubber composition according to the invention to a tread of the tire.

What is claimed is:

1. A rubber composition for use in tires comprising:
(A) 1 to 30% by weight of at least one non-crystallizable resinous polymer having a glass transition temperature of not less than 110° C. selected from the group consisting of α-methylstyrene homopolymer, α-methylstyrene-styrene copolymer, nuclear-substituted styrene homopolymer, nuclear-substituted α-methylstyrene homopolymer, styrene-nuclear-substituted styrene copolymer, styrene-nuclear-substituted α-methylstyrene copolymer and copolymers thereof containing a diene monomer; and
(B) 70 to 99% by weight of at least one rubber selected from the group consisting of styrene-butadiene copolymer rubber containing not more than 60% by weight of bound styrene produced by emulsion polymerization or solution polymerization using an organic alkali metal catalyst, natural rubber, polybutadiene rubber having a 1,4-configuration of not less than 80%, polybutadiene rubber having a 1,2-configuration of not less than 50%, halogenated butyl rubber, butyl rubber and polyisoprene rubber having a cis-1,4-configuration of not less than 90%.

2. A rubber composition according to claim 1, wherein said rubber composition comprises 1 to 30% by weight of (I) said non-crystallizable resinous polymer, 15 to 99% by weight of (II) styrene-butadiene copolymer rubber containing more than 30% by weight but not more than 50% by weight of bound styrene, and 0 to 84% by weight of at least one rubber selected from styrene-butadiene copolymer rubber containing not less than 30% by weight of bound styrene, natural rubber, polybutadiene rubber having 1,4-configuration of not less than 80%, polybutadiene rubber having 1,2-configuration of not less than 50%, polyisoprene rubber having cis-1,4-configuration of not less than 90%, halogenated butyl rubber and butyl rubber.

3. A rubber composition according to claim 1, wherein said rubber composition comprises 1 to 30% by weight of (I) said non-crystallizable resinous polymer, 30 to 99% by weight of (II) styrene-butadiene copolymer rubber containing 15 to 30% by weight of bound styrene, and 0 to 69% by weight of at least one rubber selected from natural rubber, polybutadiene rubber having 1,4-configuration of not less than 80%, polybutadiene rubber having 1,2-configuration of not less than 50%, halogenated butyl rubber, butyl rubber and polyisoprene rubber having cis-1,4-configuration of not less than 90%.

* * * * *